United States Patent [19]
Koizumi et al.

[11] Patent Number: 5,528,572
[45] Date of Patent: Jun. 18, 1996

[54] AUDIO SIGNAL RECORDING APPARATUS WITH AN INDEX NUMBER SIGNAL GENERATING FUNCTION

[75] Inventors: Satoshi Koizumi; Hirokazu Inotani, both of Tokorozawa, Japan

[73] Assignee: Pioneer Electronic Corporation, Tokyo, Japan

[21] Appl. No.: 260,927

[22] Filed: Jun. 15, 1994

[30] Foreign Application Priority Data

Jun. 16, 1993 [JP] Japan ................................. 5-144728

[51] Int. Cl.$^6$ .......................................................... G11B 7/00
[52] U.S. Cl. .............................. 369/60; 369/58; 369/59; 369/47
[58] Field of Search ................................ 369/60, 59, 58, 369/54, 67, 48, 49, 124, 52

[56] References Cited

U.S. PATENT DOCUMENTS 4,858,217  8/1989  Fujiie et al. ........................... 369/59

Primary Examiner—Georgia Y. Epps
Assistant Examiner—Muhammad N. Edun
Attorney, Agent, or Firm—Finnegan, Henderson, Farabow, Garrett & Dunner

[57] ABSTRACT

An audio signal recording apparatus is constructed to record a track number signal which allows the recording of an index number signal indicating a pause portion before a music piece also at the beginning of the recording operation. An audio signal to be recorded is delayed by a predetermined delay time period, to produce a delayed audio signal. Upon starting the recording operation, a muting operation is effected to the delayed audio signal and a resultant signal is recorded on the recording medium during the predetermined muting period after the start of the recording. During this period, a subcode information signal containing the index number signal indicating a number "0" is also recorded on the recording medium.

4 Claims, 4 Drawing Sheets

AUDIO SIGNAL RECORDING APPARATUS WITH AN INDEX NUMBER SIGNAL GENERATING FUNCTION

BACKGROUND OF THE INVENTION

1. Field of the Invention

The present invention relates to a recording apparatus for recording an audio signal.

2. Description of Background Information

In the recording of music software produced by using a recording medium such as a CD (Compact Disc), an MD (Mini Disc), and a DAT (Digital Audio Tape), it is general to record, as components of subcode information, a music piece number signal representing a music number and an index number signal representing the number of each measure (fragment) of a music piece, besides the audio signal corresponding to each music piece.

In a playing apparatus, such as a CD player, for playing back the recorded music software, the track number signal is retrieved from the subcode information, besides the retrieval of the audio signal from the recording medium so that the music piece number is identified and a fast access to the head part of a desired music piece is enabled by using the retrieved track number signal. Furthermore, by using the index number signal retrieved from the subcode information, measures existing in one music piece are identified, and the access to a head part to a desired measure of the music piece is enabled. The index number signal has a value "0" for a silent portion of the music signal, i.e. an intervening pause between tracks (music pieces), and is set to a value "1" upon starting of the first measure. Thereafter, the index number signal is incremented by one each time a change of the measure in the music piece occurs. Most CD players are designed to perform an index search operation in such a way that a change position of the index number signal is detected in response to the user's index search instruction and the head portion of the arbitrarily selected measure of the music piece is searched for by using such a change position.

Therefore, in a recording apparatus for the dubbing of music pieces from music software recorded on the above-described recording medium, such as an apparatus using a CD-R (Compact Disc Recordable), the subcode information containing the track number signal and the index number signal is recorded together with the audio signal.

However, in conventional apparatuses for the recording of the audio signal and the subcode information containing the track number signal and the index number signal, there has been a problem that the subcode signal representing the index number "0" indicative of the pause portion before a first music piece will not be recorded on the recording medium when the audio signal is recorded by an automatic recording function. With a recording medium carrying such an index number signal, the fast access to the first measure of a desired music piece cannot be performed because the detection of a change position the index number signal from "0" to "1" is not possible.

OBJECTS AND SUMMARY OF THE INVENTION

An object of the present invention is to solve the above-described problems encountered with the conventional arrangement, and to provide an audio signal recording apparatus in which the recording of an index number signal representing a period between music pieces can be performed even after the start of recording operation.

According to the present invention, a recording apparatus for recording an audio signal corresponding to at least one music piece on a recording medium, comprises a delay circuit for delaying the audio signal by a predetermined delay time period, and producing a delayed audio signal, a muting circuit for producing a muting output signal by converting the delayed audio signal to a silent signal for a predetermined muting period from a start of recording, and after the predetermined muting period has elapsed, providing the delayed audio signal itself as the muting output signal, and outputting said muting output signal, a circuit for generating a subcode signal containing an index number signal representing an index number "0" for the predetermined muting period after the start of recording, and recording device for recording a CD format signal produced from a combined signal of said muting output signal as a main code signal and said subcode signal, on said recording medium.

According to the present invention, a delayed audio signal is produced by delaying an audio signal to be recorded supplied from a signal source by a predetermined delay time period, and in response to the start of recording, a muting operation is effected to the delayed audio signal for the predetermined muting period after the start of recording, and the muted signal is recorded on the recording medium, and also a subcode signal with the index number signal representing "0" is recorded on the recording medium for the predetermined period after the start of the recording.

DETAILED DESCRIPTION OF PREFERRED EMBODIMENT

Before entering into the description of the embodiment of the audio signal recording apparatus according to the present invention, an example of arrangement for the dubbing recording will be described with reference to FIG. 1 of the accompanying drawings.

Figure 1:
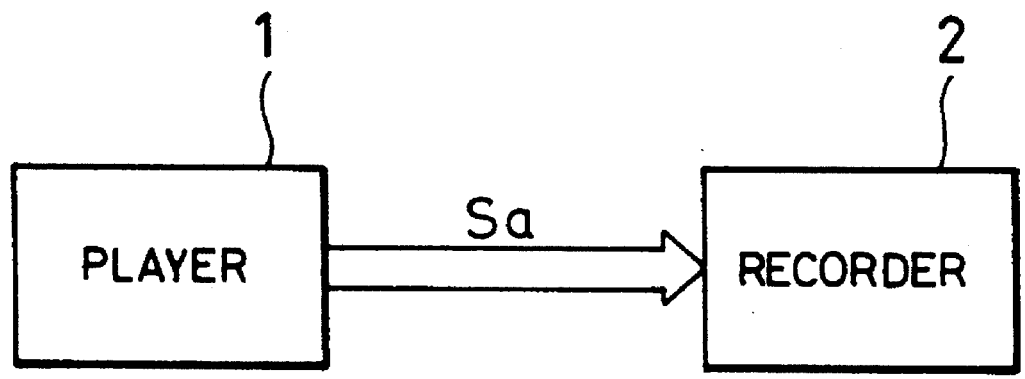
FIG. 1 is a block diagram showing an example of the arrangement for a dubbing recording operation.

As shown in FIG. 1, a CD player 1 which is used as an audio signal source plays a CD (Compact Disc) carrying music software, retrieves a subcode signal besides an audio signal Sa corresponding to music pieces recorded on the CD, and supplies it to a CD-R (Compact Disc Recordable) recorder 2 which is used as a recording apparatus.

The CD-R recorder 2, on the other hand, is designed to modulate the audio signal and the subcode signal to produce a modulation signal, further to modulate a light beam by the modulation signal and to perform the recording by irradiating the modulated light beam on the recording medium. By this operation of the CD-R recorder 2, an audio signal and a subcode signal which are identical with those signals recorded on the music software CD in the signal source are recorded on the recording disc.

However, if the dubbing operation is performed with an automatic recording function by which the recording is automatically started in response to the supply of a music piece from the signal source, the subcode signal corresponding to the silent portion provided before a music piece to be supplied first, i.e. the subcode signal corresponding to the pause portion before the music piece will not be recorded on the recording disk. In such a case, the index number signal carrying the number "0" indicating a pause portion before a music piece is not recorded on the recording disc, so that the number "1" is recorded immediately from the beginning.

Therefore, as mentioned before, if an index search operation is performed in a player in which such a recording disc is loaded, the change of the index number signal from a "0" state to a "1" state cannot be detected. As a result, the fast access to the head portion of a desired music piece could not be performed with such a recording medium.

Now, the embodiment of the audio signal recording apparatus according to the present invention will be described.

Figure 2:
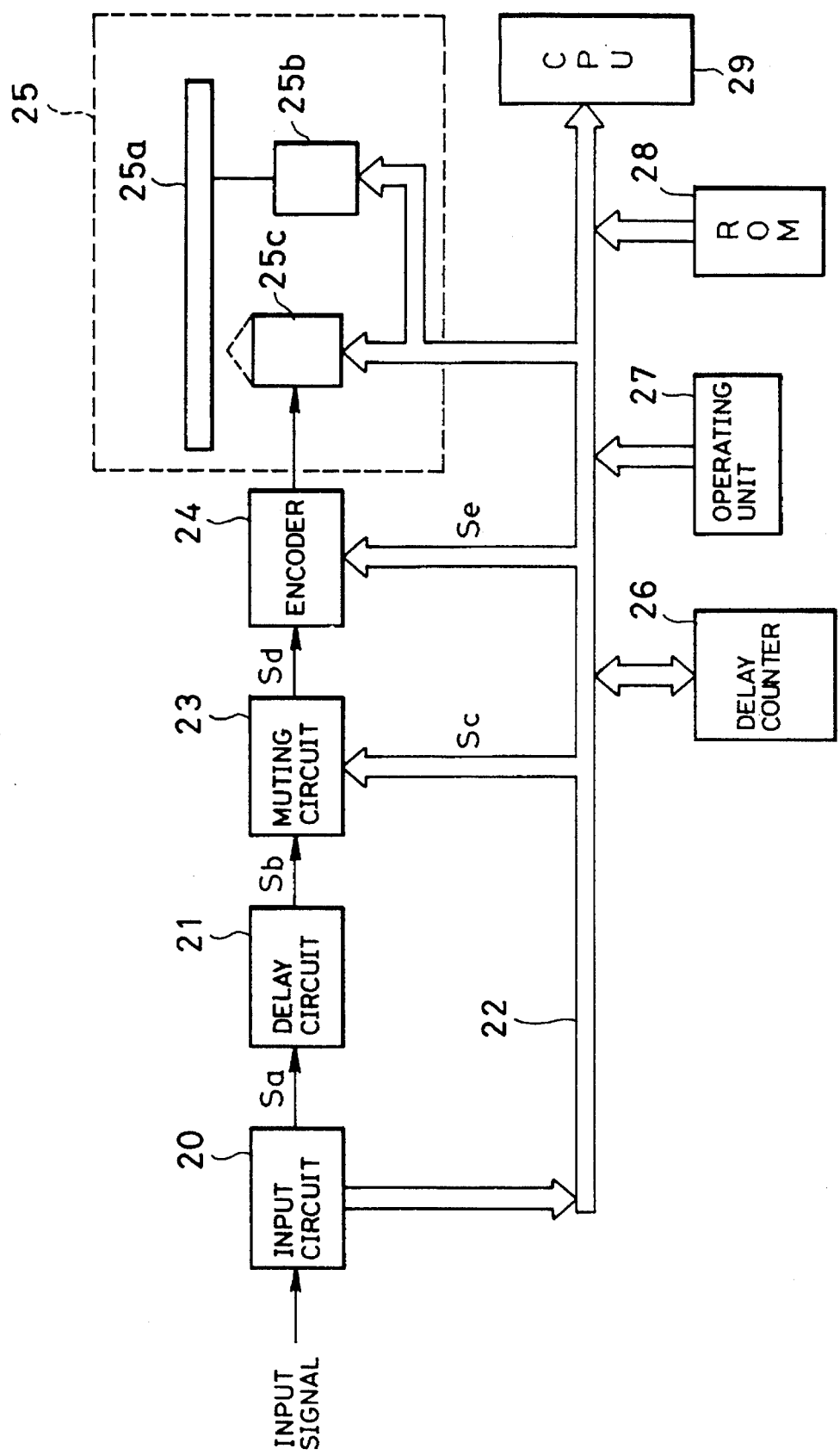
FIG. 2 is a block diagram showing the structure of the audio signal recording apparatus according to the present invention.

FIG. 2 shows the structure of the audio signal recording apparatus according to the present invention.

In the figure, a digital signal supplied from a signal source is fed to an input circuit 20. The input circuit 20 extracts a audio signal Sa corresponding to music pieces from the supplied digital signal and supplies it to a delay circuit 21. The input circuit 20 further extracts a subcode signal from the supplied digital signal, and supplies it to the delay circuit 21. The delay circuit 21 delays the supplied audio signal Sa by a predetermined period (delay time) T1, and supplies it to a muting circuit 23 as a delayed audio signal Sb. The muting circuit 23 performs a muting operation described below if a mute control signal Sc supplied through a CPU bus 22 is a muting-ON requesting signal. In response to the muting-ON requesting signal, the muting circuit 23 starts a muting function by which the delayed audio signal Sb is converted to a silent signal identical with the digital audio signal in a silent state. The muting circuit 23 transmits the silent signal to an encoder 24 as a muting output signal Sd. If, on the other hand, the muting control signal Sc is a muting-OFF signal, the muting circuit 23 cancels the muting operation, to relay the delayed audio signal Sb as it is to the encoder 24, as the muting output signal Sd.

The encoder 24 produces a CD format signal by combining the muting output signal Sd, as a main code signal, with a subcode signal Se supplied through the CPU bus 22, and supplies a modulation signal Sf obtained by modulating the CD format signal, to a recording unit 25.

The recording unit 25 includes a recording disc 25a as an audio signal recording medium, a spindle motor 25b for rotating the recording disc 25a, and an optical head 25c for modulating a light beam by the modulation signal Se and irradiating the modulated light beam on the recording disc 25a. By means of the light beam irradiated from the optical head 25c, the modulation signals Sf is recorded on the recording disc 25a. The apparatus also includes a delay counter 26 that is arranged to start a counting operation in response to a count start instruction signal supplied via the CPU bus 22, and to transmit a count value T of each moment to the CPU bus 22. ((In response to a counter reset instruction signal supplied via the CPU bus 24, the delay counter 26 resets the count value T and stops the counting operation.))

Furthermore, an operating unit 27 is used to transmit an operation request signal to the CPU bus 22 according to a user's instruction of operation. For example, the operating unit 27 transmits a recording operation request signal to the CPU bus 22 in accordance with a recording operation instruction by the user. Through the CPU bus 22, a CPU (Central Processing Unit) 29 executes various control operations of the recording apparatus including the above-described elements, in accordance with operational procedures stored in a ROM (Read Only Memory) 28.

The recording operation of the recording apparatus according to the present invention will be described hereinafter with reference to FIGS. 3 and 4 of the accompanying drawings.

At first, a recording operation request signal is transmitted from the operating unit 27 to the CPU bus 22 in response to the user's instruction of recording. In response to the recording operation request signal, the CPU 29 transmits a control signal to place the recording unit 25 at a recording pause state to the CPU bus 22. Then the CPU 29 reads the subcode signal supplied from the input circuit 20 through the CPU bus 22, and judges whether or not the audio signal Sa corresponding to the first music piece to be recorded is supplied from the signal source. In this instance, as shown in FIG. 3, if it is judged that the audio signal Sa is supplied from the signal source, the CPU 29 transfers the control of operations to an initial recording subroutine which is shown in the flowchart of FIG. 4.

Figure 4:
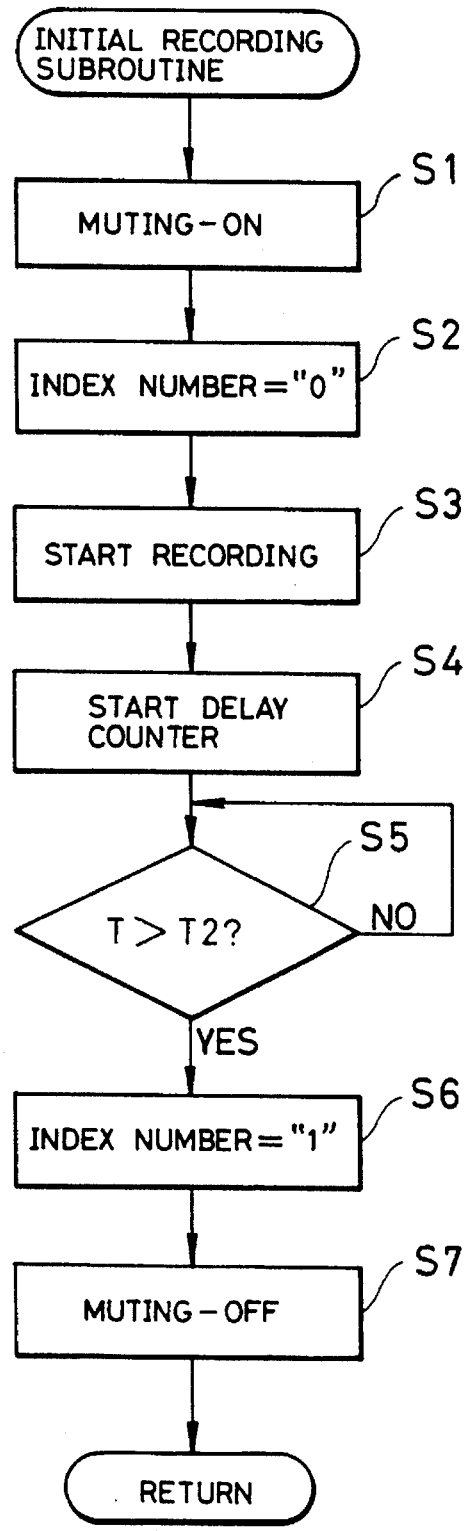
FIG. 4 is a flowchart showing the processing steps in an initial recording subroutine performed by the audio signal recording apparatus according to the present invention.

As shown in the flowchart of FIG. 4, the CPU 29 at first supplies, as the mute control signal Sc, a mute-ON request signal to the muting circuit 23 through the CPU bus 22 (step S1). In response to the mute-ON signal, the muting circuit 23 starts the muting operation by which a signal corresponding to the silent state is supplied to the encoder 24 as the mute output signal Sd. Then, the CPU 29 generates a subcode signal Se containing an index number signal being set to "0", and transmits it to the recording unit 25 through the CPU bus 22 (step S2).

Subsequently, the CPU 29 transmits a recording start instruction signal to the recording unit 25 through the CPU bus 22 (step S3). In response to this instruction signal, the recording unit 25 cancels a pause state, to start the recording operation. Then, the CPU 29 transmits a counter start instruction signal to the delay counter 26 through the CPU bus 22 (step S4). In response to this instruction, the delay counter 26 starts the counting operation, and the count value T of the moment is transmitted to the CPU bus 22. Subsequently, the CPU 29 performs a comparison of the count value T and a period T2 (step S5) until the count value exceeds a value corresponding to the period T2. The period T2 is determined to be slightly shorter than the delay time T1 of the delay circuit 21.

During the period in which the operation of the step S5 is performed, the muting output signal Sd and the subcode signal Se of the index number "0" are supplied respectively to the encoder 24. Accordingly, the modulation signal produced by modulating a CD format signal formed from the signal $Sf_1$ corresponding to the silent state and the subcode signal $Sf_2$ of the index number "0" is recorded on the recording disc 25a during this period. When it is detected in step S5 that the count number T of the delay counter 26 has exceeded the period T2, the CPU produces the subcode signal Se with the index number "1", and transmits it to the encoder 24 trough the CPU bus 22 (step S6). Then the CPU 29 supplies, as the muting control signal Sc, a muting-OFF request signal to the muting circuit 23 through the CPU bus 22 (step S7). In response to the muting-OFF request signal, the muting circuit 23 stops the muting operation.

After the completion of this operation, the delayed audio signal corresponding to the first music piece is supplied to the muting circuit 23. In this instance, therefore, the delayed audio signal corresponding to the first music piece without having been changed is supplied as the muting output signal Sd to the encoder 24, and the subcode signal Se representing the index number "1" is supplied to the encoder 24 at the same time. By this operation, the modulation signal Sf produced by modulating a CD format signal formed from the delayed audio signal $Sf_1$ corresponding to the first music piece and the subcode signal $Sf_2$ of the index number "1" is recorded on the recording disc 25a.

In the embodiment described above, the period T2 is measured by the delay counter 26. It is, however, also possible to arrange the apparatus that the CPU 29 measures the period T2 by counting the number of frames in the supplied subcode signal.

After the execution of the operation in step S7, the operation of the CPU 29 exits from the initial recording subroutine, and returns to the normal recording operation executing routine.

In the normal recording operation executing routine, the delayed audio signal Sd without having been processed by the muting operation is directly supplied, as the muting output signal, to the encoder 24. Also, the CPU 29 directly supplies, as the subcode signal Se, the subcode signal supplied from the signal source to the encoder 24. By this normal recording operation, the audio signal and the subcode signal recorded on the music software CD in the signal source are directly recorded on the recording disc 25a in a consecutive manner.

Figure 3:
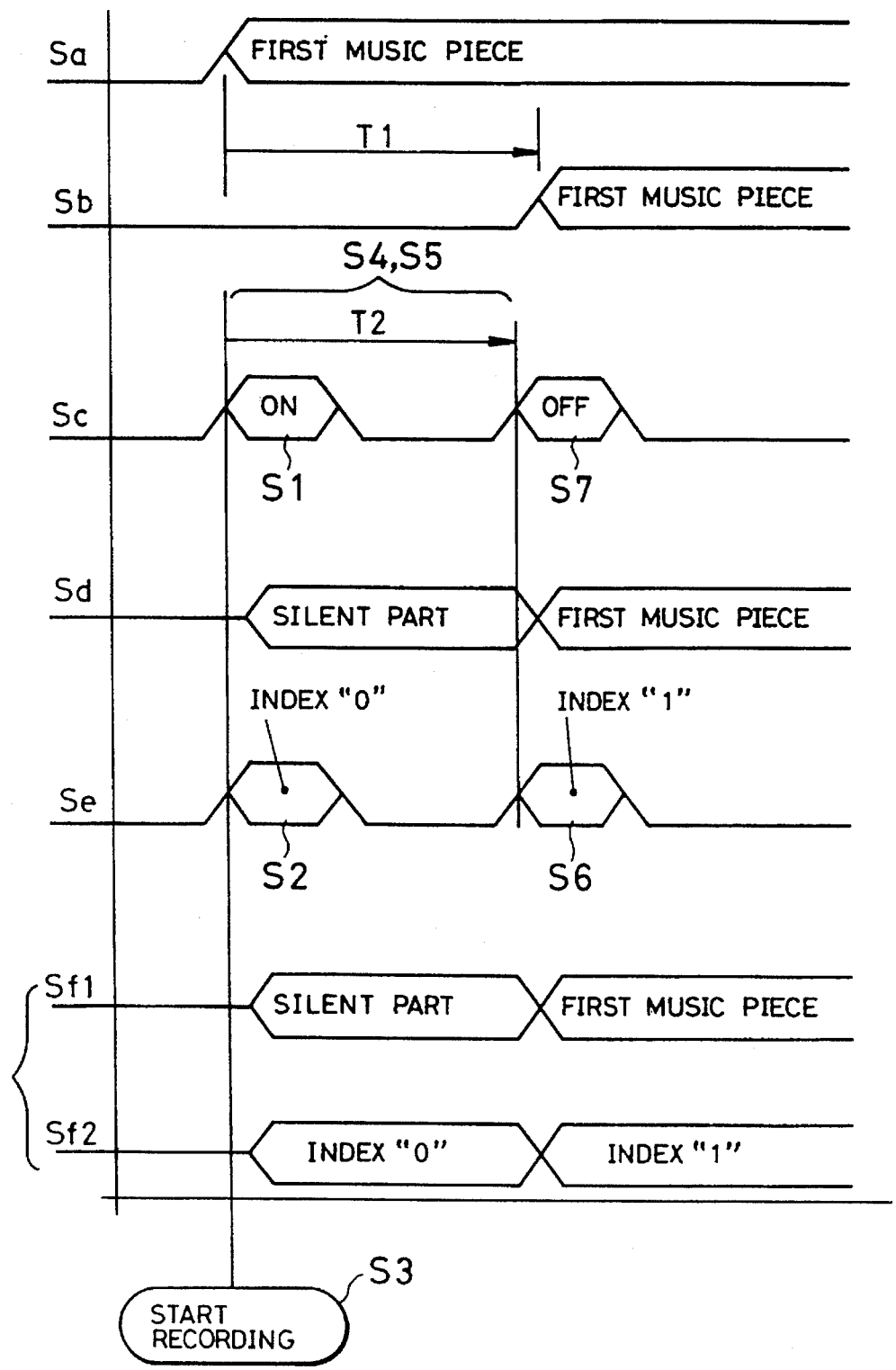
FIG. 3 is a timing chart showing an example of recording operation by the audio signal recording apparatus according to the present invention.

As described in the foregoing, the audio signal recording apparatus according to the present invention executes the initial recording subroutine before the execution of the normal recording operation, wherein the silent state signal and the subcode signal representing the index number "0" shown in FIG. 3 are produced, and the produced signals are recorded prior to the audio signal corresponding to the first music piece supplied from the signal source. Thus, according to the present invention, a pause portion before a music piece (silent state) with an index number signal "0" is automatically recorded on the recording medium before the audio signal from the signal source even if such an audio signal is supplied immediately after (or at the same time as) the start of the recording operation.

Moreover, in the audio signal recording apparatus according to the present invention, a delay circuit (the delay circuit 21) is provided in the recording signal line as illustrated in FIG. 2. Therefore, the recording of the audio signal is performed at the timing a predetermined time period delayed from the timing of the supply of the audio signal from the signal source. With this feature, if the user of the apparatus recognizes a mistake in the recording operation after instructing the start of the recording, the recording of the signal on the recording disc can be stopped by instructing the stop of the recording within the delay time of the delay circuit 21 even if the supply of the signal corresponding to the music piece from the signal source has been started. In such a way, an erroneous recording operation can be prevented by using the feature of the apparatus according to the present invention.

In addition to the index number signal which has been discussed in the foregoing description, the subcode signal of a CD or a CD-R carries a copy-bit signal for the purpose of the protection of copyright. In performing the dubbing operation, the recording apparatus at first detects the copy-bit signal in the subcode signal supplied from the signal source, and judges whether or not the copy-bit signal indicates the prohibition of copying. If it is judged that the copy-bit signal indicates the prohibition of copying, the recording apparatus must not perform the recording of the music piece of which the copy is prohibited. Therefore, by setting the delay time of the delay circuit 21 shown in FIG. 2 to be longer than a time required for the detection of the copy-bit and the judgment of the contents of the copy-bit, it is possible to prevent a trouble such that the recording of the music piece of which the copying is prohibited is started before the detection and judgement of the copy-bit are completed.

As explained in the foregoing, in the audio signal recording apparatus according to the present invention a delayed audio signal is obtained by delaying the audio signal to be recorded, which is supplied by a signal source, by a predetermined time period. In response to a start of the recording, a silent signal is produced by effecting a muting operation to the delayed audio signal for the predetermined time period after the start of the recording. The silent signal as well as the subcode signal representing the index number "0" for the predetermined time period is recorded on the recording medium.

Thus, according to the present invention, a silent portion with an index number signal "0" is automatically recorded on a recording medium before an audio signal even if the audio signal to be recorded is supplied from the signal source immediately after the start of the recording. Therefore, when an index search operation by which a music piece is searched for using an index number is performed during the play of such a recording medium, an access to the head portion of the first measure of a desired music piece is surely performed.

What is claimed is:

1. A recording apparatus for recording an audio signal corresponding to at least one music piece on a recording medium, comprising:

delay means for delaying said audio signal by a predetermined delay time period, and producing a delayed audio signal;

muting means for producing a muting output signal by converting said delayed audio signal to a silent signal for a predetermined muting period from a start of recording, and after said predetermined muting period has elapsed, rendering said delayed audio signal itself as said muting output signal, and outputting said muting output signal;

means for generating a subcode signal containing an index number signal representing an index number "0" for said predetermined muting period after the start of recording; and recording means for recording a CD format signal produced from a combined signal of said muting output signal as a main code signal and said subcode signal, on said recording medium.

2. A recording apparatus as claimed in claim 1, wherein said predetermined muting period is equal to or shorter than said predetermined delay time period.

3. A recording apparatus for recording an audio signal corresponding to at least one music piece on a recording medium, comprising:

delay means for receiving said audio signal and delaying said audio signal by a predetermined delay time period to produce a delayed audio signal;

muting means for receiving said delayed audio signal and producing a muting output signal;

control means for receiving a subcode signal contained in said audio signal and producing a modified subcode signal having index number data;

a delay counter connected to said control means; and an encoder for receiving said muting output signal produced by said muting means and said modified subcode signal produced by said control means, and producing a recording signal.

4. A recording apparatus as claimed in claim 3, wherein said control means includes:

means for supplying a mute-on signal to said muting means to enable its muting operation, thereby rendering said muting output signal silent, upon start of recording;

means for setting said index number data of said modified subcode signal to "zero" and supplying said modified subcode signal to said encoder upon start of recording;

means for starting a count operation of said delay counter upon start of recording;

means for determining if a predetermined muting period has been elapsed from a start of recording, by monitoring a count value of said delay counter;

means for supplying a mute-off signal to said muting means so that said delayed audio signal is supplied to said encoder as said muting output signal, upon lapse of said predetermined muting period; and means for setting said index number data of said modified subcode signal to "one" and supplying said modified subcode signal to said encoder, upon lapse of said predetermined period, whereby said encoder produces said recording signal by encoding said delayed audio signal provided as said muting output signal and said modified subcode signal with said index number data being set to "one".

* * * * *